US008436488B2

(12) United States Patent
Giesselbach et al.

(10) Patent No.: US 8,436,488 B2
(45) Date of Patent: May 7, 2013

(54) SEMI-DIRECT VARIABLE SPEED DRIVE WITH N+1 POWER AVAILABILITY

(75) Inventors: Jeroen Giesselbach, Landsmeer (NL); Clemens Van Der Nat, The Hague (NL); Pieter Cornelis Burger, Zoetermeer (NL)

(73) Assignee: Bluewater Energy Services B.V., Hoofddorp (NL)

( * ) Notice: Subject to any disclaimer, the term of this patent is extended or adjusted under 35 U.S.C. 154(b) by 462 days.

(21) Appl. No.: 12/714,632

(22) Filed: Mar. 1, 2010

(65) Prior Publication Data

US 2010/0225165 A1      Sep. 9, 2010

(30) Foreign Application Priority Data

Mar. 3, 2009   (EP) ...................................... 09003005
Feb. 17, 2010  (EP) ...................................... 10153790

(51) Int. Cl.
     *H02J 1/10*         (2006.01)
(52) U.S. Cl.
     USPC ........................................... 307/23; 318/723
(58) Field of Classification Search .................. 307/9.1, 307/23; 701/21; 318/723
     See application file for complete search history.

(56) References Cited

U.S. PATENT DOCUMENTS

| | | | |
|---|---|---|---|
| 3,154,043 A * | 10/1964 | Momsen, Jr. .................. | 440/16 |
| 6,471,286 B1 | 10/2002 | Manders | |
| 6,592,412 B1 | 7/2003 | Geil | |
| 8,269,449 B2 * | 9/2012 | Bjerknes et al. .............. | 318/723 |
| 2005/0116541 A1 * | 6/2005 | Seiver ............................. | 307/16 |
| 2005/0177756 A1 | 8/2005 | Dobbs | |
| 2007/0040263 A1 | 2/2007 | Towada | |
| 2008/0197797 A1 * | 8/2008 | El-Ibiary ....................... | 318/567 |
| 2008/0207066 A1 * | 8/2008 | Chung et al. ..................... | 440/6 |
| 2008/0284369 A1 * | 11/2008 | Jones et al. ................... | 318/722 |

(Continued)

FOREIGN PATENT DOCUMENTS

| | | |
|---|---|---|
| DE | 10128152 | 12/2002 |
| DE | 10128152 A1 | 12/2002 |

(Continued)

OTHER PUBLICATIONS

Official Search Report of the European Patent Office in counterpart foreign application No. EP10153790 filed Mar. 3, 2009.
Official Search Report of the European Patent Office in counterpart foreign application No. EP09003005 filed Mar. 3, 2009.

*Primary Examiner* — Daniel Cavallari
(74) *Attorney, Agent, or Firm* — Steven M. Koehler; Westman, Champlin & Kelly P.A.

(57) ABSTRACT

A system for controlling a speed of each of N variable speed motors with a drive voltage is disclosed, where N is an integer equal to or greater than 1. The system includes (N+1) generators and a switching arrangement configured to directly couple, in a one-to-one relation, the N variable speed motors to the (N+1) generators so that any one of the N variable speed motors is capable of operating in at least a first mode and a second mode. In the first mode the any one of the N variable speed motors is driven with the drive voltage generated by a first generator of at least two of the (N+1) generators, and in the second mode the any one of the N variable speed motors is driven with the drive voltage generated by a second generator of the at least two of the (N+1) generators.

28 Claims, 5 Drawing Sheets

U.S. PATENT DOCUMENTS

2009/0072624 A1    3/2009    Towada
2009/0184575 A1*    7/2009    Armstrong et al. ............ 307/9.1
2010/0094490 A1*    4/2010    Alston et al. ................... 701/21

FOREIGN PATENT DOCUMENTS

EP    1637447    3/2006
EP    1637447 A    3/2006
WO    WO 2008130968 A1 *    10/2008

* cited by examiner

| Combination | Generator duty M(i)=variable speed; no=not operating | | | | Aux. Sw. Closed |
| --- | --- | --- | --- | --- | --- |
| # | $G_1$ | $G_2$ | $G_3$ | $G_4$ | |
| 1 | M1 | M2 | M3 | no | S2 |
| 2 | M1 | M2 | no | M3 | |
| 3 | M1 | no | M2 | M3 | |
| 4 | no | M1 | M2 | M3 | S1 |

Fig.4

| Combination | Generator duty M(i)=variable speed; f=fixed voltage; no=not operating | | | | | Aux. Sw. Closed |
| --- | --- | --- | --- | --- | --- | --- |
| # | $G_1$ | $G_2$ | $G_3$ | $G_4$ | $G_5$ | |
| 1 | M3 | M1 | M2 | f | no | |
| 2 | M3 | M1 | M2 | no | f | |
| 3 | M3 | M1 | f | M2 | no | |
| 4 | M3 | M1 | no | M2 | f | |
| 5 | M3 | M1 | f | no | M2 | S2 |
| 6 | M1 | M2 | no | f | M3 | S1 |
| 7 | M1 | f | M2 | M3 | no | S2 |
| 8 | M3 | no | M1 | M2 | f | S1 |
| 9 | M1 | f | M2 | no | M3 | |
| 10 | M1 | no | M2 | f | M3 | |
| 11 | M1 | f | no | M2 | M3 | |
| 12 | M1 | no | f | M2 | M3 | |
| 13 | f | M1 | M2 | M3 | no | S2 |
| 14 | no | M1 | M2 | M3 | f | S4 |
| 15 | f | M1 | M2 | no | M3 | |
| 16 | no | M1 | M2 | f | M3 | |
| 17 | f | M1 | no | M2 | M3 | |
| 18 | no | M1 | f | M2 | M3 | |
| 19 | f | no | M1 | M2 | M3 | S1 |
| 20 | no | f | M1 | M2 | M3 | S3 |
| 21 | no | f | M2 | M1 | M3 | S4 |

SEMI-DIRECT VARIABLE SPEED DRIVE WITH N+1 POWER AVAILABILITY

BACKGROUND

The discussion below is merely provided for general background information and is not intended to be used as an aid in determining the scope of the claimed subject matter.

Power systems configured to generate energy and to use the generated energy to drive mechanical equipment or motors are widely used. Furthermore, often it is desirable or required to be able to control the rotational speed of mechanical rotating equipment driven by the generated energy. For example, for a compressor to function properly, the start-up and warm-up speed of the compressor must be carefully controlled to keep process variables within range.

Figure 1:
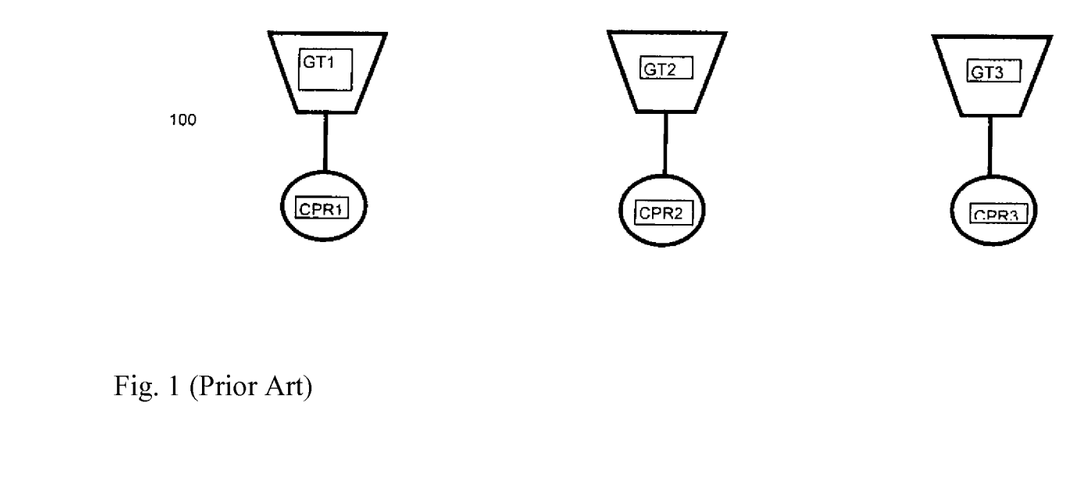
FIG. 1 is a schematic illustration of a direct coupling system for controlling speed of each variable speed motor according to prior art.

A system capable of generating energy and using the generated energy to drive mechanical rotating equipment while controlling the rotational speed of the equipment is illustrated in FIG. 1. As shown, a system 100 includes gas turbines GT1, GT2, and GT3. The gas turbines GT1-GT3 are directly coupled to mechanical rotating equipment, such as, for example, compressors CPR1, CPR2, and CPR3. In this type of system, the gas turbines GT1, GT2, and GT3 convert thermal energy of combustion gas into mechanical energy directly used to drive the compressors CPR1, CPR2, and CPR3. One drawback of such a system is low reliability because if one of the gas turbines GT1, GT2, or GT3 breaks down or needs to be taken out for maintenance, the compressor coupled to this turbine cannot function. The gas turbine can be any kind of main driver, e.g. fired engine or steam turbine.

US 2005/177756 discloses a power distribution system that includes a plurality of loads and a plurality of power sources. The power distribution system also includes an interconnect arrangement including a plurality of interconnects. The interconnects connect each load to a given number of different ones of the sources so that each load is fully powered notwithstanding failure of any one of the sources.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One embodiment of the present invention discloses a system for controlling a speed of each of N variable speed motors with a drive voltage (e.g. a three phase AC voltage), where N is an integer equal to or greater than 1. The system includes (N+1) generators configured to drive the N variable speed motors. The system also includes a switching arrangement configured to directly couple the N variable speed motors to present generators, where the present generators comprise the (N+1) generators, so that any one of the N variable speed motors is capable of operating in at least a first mode and a second mode. In the first mode the any one of the N variable speed motors is driven with the drive voltage generated by a first generator of at least two of the present generators. In the second mode the any one of the N variable speed motors is driven with the drive voltage generated by a second generator of the at least two of the present generators. In such a system, the speed of the each of N variable speed motors may be controlled by modulating frequency, amplitude, or both, frequency and amplitude, of the drive voltage.

An aspect of the present invention resides in directly coupling the N variable speed motors (each of which, for example, can comprise one or more electrical motors) to present generators in a manner that allows any of the N variable speed motors to be driven by at least two of the present generators. The disclosed system allows, for example, operation of three different variable speed motors on four generators. As a result, the generators may be operated at (N+1) availability, which leads to an increased availability of the system. At the same time, the one-to-one correspondence between the generators and the variable speed motors due to the direct coupling allows preserving sufficiently high efficiency of the overall system, while maintaining a relatively small footprint of the system as well as a relatively small cost. Due to the above-mentioned features, the disclosed system may be referred to as a "semi-direct variable speed drive with N+1 power availability."

In one embodiment one additional generator is included so that any one of the present generators may be directly coupled to a fixed voltage and fixed frequency bus bar, where the other N generators may be directly coupled to the N variable speed motors, and while the remaining generator is either on stand by mode, or in maintenance, to be available for either the fixed frequency system or the variable speed system. One or more of the variable speed motors may also be synchronized with the fixed voltage and fixed frequency bus bars to allow for load sharing and/or change of duty of the connected main driver/generator. In a further embodiment, the system can be configured to drive both variable and fixed speed motors.

Each of the present generators may receive mechanical energy from a main driver. The main driver may be, for example, a gas turbine configured to convert thermal energy of a combustion gas into mechanical energy. The gas turbine may comprise compressor(s) and combustion turbine(s), a steam turbine, or a gas or liquid fuel fired motor. If desired, different kinds of variable speed motors can be employed.

The N variable speed motors can be used to drive mechanical rotating equipment, such as, for example, a compressor. In other embodiments, the systems may be altered to include multiple electric bus bar systems in lieu of the N variable speed motors and the mechanical rotating equipment.

In one embodiment, a specific kind of the drive voltage can be provided to each of the N variable speed motors.

Optionally, a dedicated stand-by generator can be provided for use when one of the other N generators cannot operate.

A particular advantageous use of the systems herein described is on off-shore installations.

A method for operating (parts of) the system is also disclosed.

Hereinafter, an embodiment of the invention will be described in further detail. It should be appreciated, however, that this embodiment may not be construed as limiting the scope of protection for the present invention.

DETAILED DESCRIPTION OF THE ILLUSTRATIVE EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring aspects of the present invention.

Figure 2:
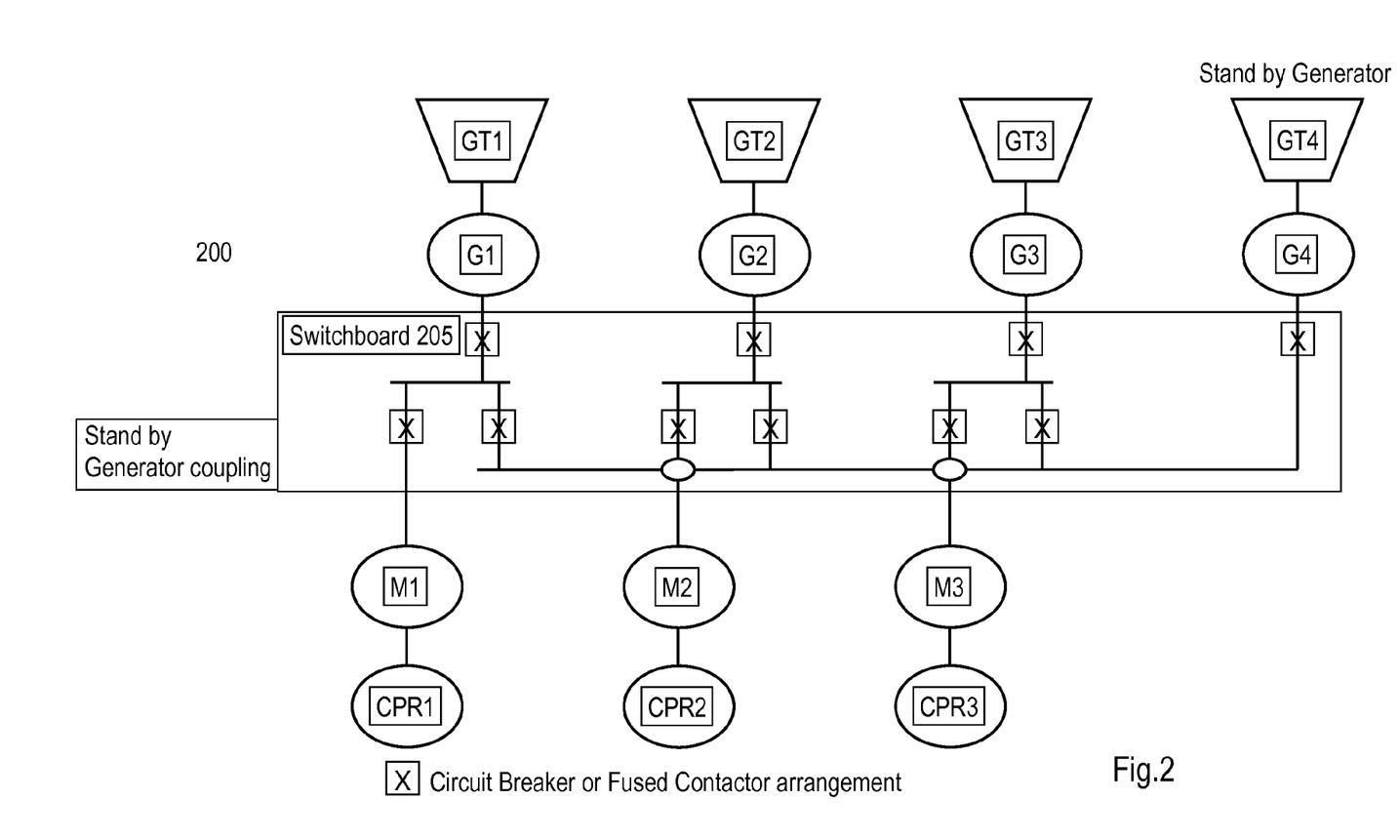
FIG. 2 is a schematic illustration of an (N+1) availability system for controlling speed of each variable speed motor, according to one embodiment of the present invention.

FIG. 2 is a schematic illustration of an (N+1) availability system 200 for controlling speed of each variable speed motor, according to one embodiment of the present invention. As shown, the system 200 includes four generators G1, G2, G3, and G4 configured to convert mechanical energy to electrical energy. In one embodiment, the generators G1-G4 may receive the mechanical energy from gas turbines, shown as GT1, GT2, GT3, and GT4 that are configured to convert thermal energy of the combustion gas to mechanical energy. In other embodiments, the generators G1-G4 may receive mechanical energy from other fired engines (for example, steam turbine, gas motor or diesel motor operating on any fuel). Herein, the gas turbines (or steam turbines or other fired engines) providing mechanical energy to the generators are sometimes referred to as "main drivers" in order to indicate that they represent the initial source of the energy provided to the variable speed motors.

The system 200 further includes three variable speed motors, shown as M1, M2, and M3, and a switching arrangement, shown as a switchboard 205, configured to directly couple, in a one-to-one relation, the generators G1-G4 to the variable speed motors M1-M3. Each of the variable speed motors M1-M3 is, in turn, connected to a piece of mechanical rotating equipment, for example, a compressor, shown in FIG. 2 as CPR1, CPR2, and CPR3. Alternatively, one or more of the variable speed motors M1-M3 may also be exchanged for one or more electrical distribution networks by introducing multiple bus bars systems in lieu of the motor and mechanical rotating equipment. The one or more variable speed motors M1-M3 may comprise one or more electrical motors.

The generators G1-G4 are configured to drive each of the variable speed motors M1-M3 with a variable drive voltage. The drive voltage may be varied (modulated) in amplitude, frequency, or both amplitude and frequency, in order to achieve the desired speed and torque for each of the variable speed motors M1-M3. Variable speed motors M1-M3 are typically driven by a 3-phase AC voltage. In turn, the variable speed motors M1, M2, and M3 are configured to convert the electrical energy of the variable drive voltage to the mechanical energy that drives the compressors CPR1, CPR2, and CPR3. Thus, by modulating the drive voltage provided to the variable speed motors M1-M3 to control the speed and the torque of the motors M1-M3, the rotational speed of the compressors CPR1-CPR3 may be controlled as well.

As shown, the generator G4 is configured to be a dedicated stand-by generator. The switchboard 205 allows any of the variable speed motors M1-M3 to be driven by at least two of the generators G1-G4. In other words, each of the variable speed motors M1-M3 may be operated in at least two different modes: in the first mode the variable speed motors M1, M2, and M3 are driven with drive voltages generated by the generators G1, G2, and G3, respectively, in a one-to-one relation between each of the variable speed motors M1-M3 and the generators G1-G3, and in the second mode each of the variable speed motors M1, M2, and M3 is driven with drive voltages generated by the dedicated stand-by generator G4. For example, in the first mode all three motors can be started and subsequently be synchronized to form an electric power distribution network that will allow for load sharing. In the second mode, the stand by generator G4 can be operated to allow for maintenance of any one of the main driver-generator combinations (i.e., the combinations of GT1-GT3 and G1-G3). With such a configuration, if, for example, the generator G2 is not operating (i.e., the generator G2 may be, for example, out of service due to failure or maintenance, or may be in a stand by mode), all of the variable speed motors M1-M3 may still remain operating. In such a case, the variable speed motors M1 and M3 may be operated in the first mode (i.e., the variable speed motors M1 and M3 are driven by the generators G1 and G3, respectively), while the variable speed motor M2 may be operated in the second mode (i.e, the variable speed motor M2 is driven by the stand-by generator G4).

Since in the system 200 four of the gas turbines GT1-GT4 are configured to drive three variable speed motors M1-M3, the system 200 is operated by having one redundant gas turbine-generator combination which may be used to provide electrical power when one of the other three gas turbine-generator combinations fail. Such a configuration is referred to herein as having (N+1) availability, where the term "availability" refers to the ability of the power consumers (e.g., the variable speed motors M1-M3 or the compressors CPR1-CPR3) to obtain the desired electrical power. If a power consumer cannot obtain the desired power, the power consumer is said to be "unavailable." Having the (N+1) configuration in the system 200 results in greater availability of the system 200 when compared to, for example, the system 100.

Note that the operational envelope of the dedicated stand-by generator G4 is limited as the stand-by generator G4 should be brought back to the stand-by mode as soon as possible in order to be able to stand-by again for the other generators. Thus, the system 200 does not have the option to share load equally over time (for example, wear and tear of the generators G1-G4).

Figure 3:
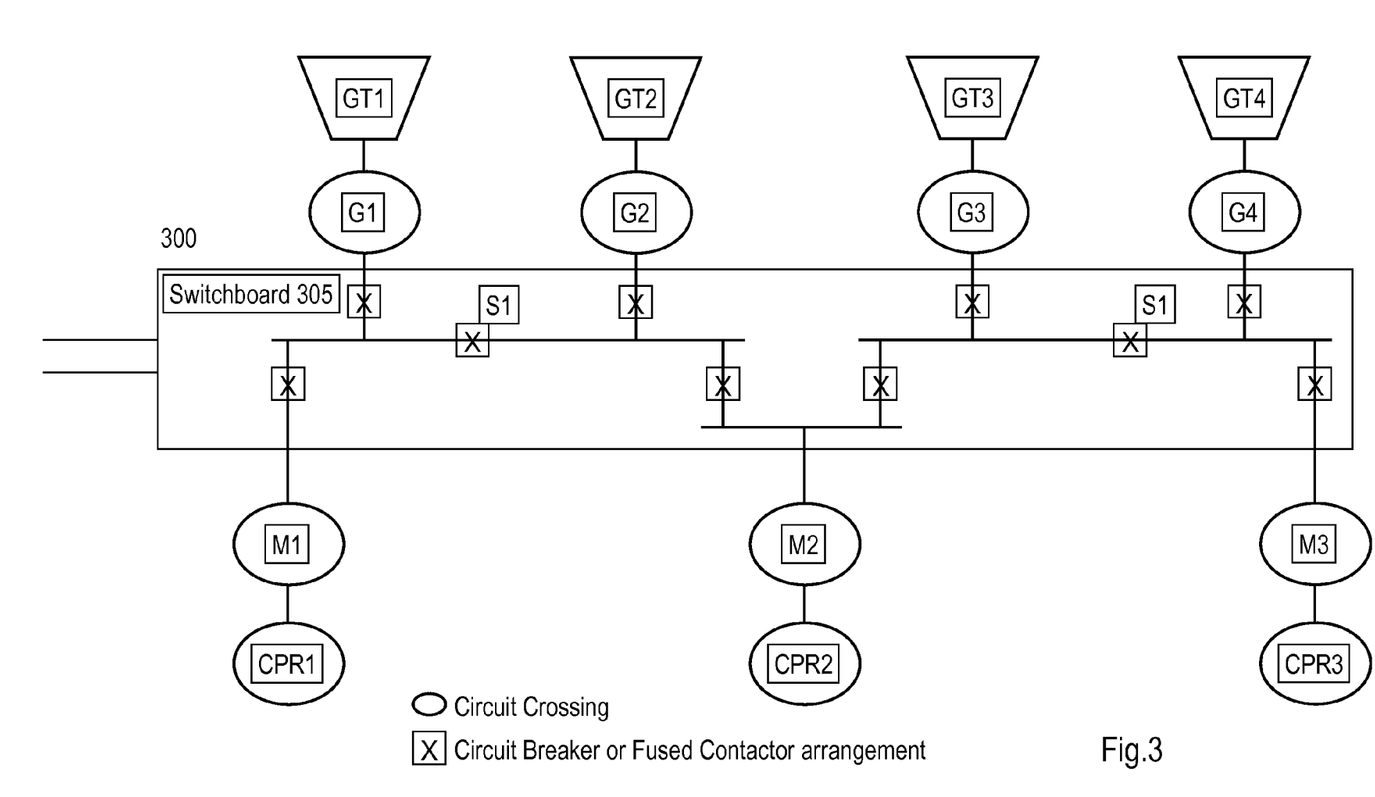
FIG. 3 is a schematic illustration of an (N+1) availability system for controlling speed of each variable speed motor, according to another embodiment of the present invention.

FIG. 3 is a schematic illustration of an (N+1) availability system 300 for controlling speed of each variable speed motor, according to another embodiment of the present invention. As shown, the system 300 also includes four generators G1-G4 configured to convert mechanical energy to electrical energy. Again, the generators G1-G4 may receive the mechanical energy from gas turbines GT1-GT4 or from other types of main drivers.

Similar to the system 200, the system 300 further includes three variable speed motors M1-M3, and a switching arrangement, shown as a switchboard 305, configured to directly couple, in a one-to-one relation, the generators G1-G4 to the variable speed motors M1-M3. Each of the variable speed motors M1-M3 is, in turn, connected to a piece of mechanical rotating equipment, for example, a compressor, shown as CPR1, CPR2, and CPR3. The one or more variable speed motors M1-M3 may comprise one or more electrical motors. Again, the generators G1-G4 are configured to drive each of the variable speed motors M1-M3 with a variable drive voltage. The drive voltage may be varied (modulated) in amplitude, frequency, or both amplitude and frequency, in order to achieve the desired speed for each of the variable speed motors M1-M3. Variable speed motors M1-M3 are driven by a 3-phase AC voltage. In turn, the variable speed motors M1, M2, and M3 are configured to convert the electrical energy of the variable drive voltage to the mechanical energy that drives the compressors CPR1, CPR2, and CPR3. Thus, by modulating the drive voltage provided to the variable speed motors M1-M3 to control the speed and the torque of the motors M1-M3, the rotational speed of the compressors CPR1-CPR3 may be controlled as well. Alternatively, one or more of the motors can also be exchanged for one or more electrical distribution networks by introducing multiple bus bars systems in lieu of the motor and rotating equipment.

By using switches, the switchboard 305 allows any of the variable speed motors M1-M3 to be driven by at least two of the generators G1-G4 within specific dedicated combinations (an example of a set of dedicated combinations is described below). In other words, each of the variable speed motors M1-M3 may be operated in at least two different modes: in the first mode the variable speed motor M1, M2, or M3 is driven with a drive voltage generated by one of the generators G1-G4, and in the second mode the variable speed motor M1, M2, or M3 is driven with a drive voltage generated by another one of the generators G1-G4. For example, the switchboard 305 may include switches S1 and S2 as shown on FIG. 3. The switches S1 and S2 allow the following dedicated combinations: the variable speed motor M1 may be driven, in the first mode, by the generator G1 and, in the second mode, by the generator G2; the variable speed motor M2 may be driven, in the first mode, by the generator G2 and, in the second mode, by the generator G3; finally, the variable speed motor M3 may be driven, in the first mode, by the generator G3 and, in the second mode, by the generator G4. With such a configuration, if, for example, the generator G2 is not operating (i.e, the generator G2 may be, for example, out of service due to failure or maintenance, or may be in a stand by mode), all of the variable speed motors M1-M3 may still remain operating. In such a case, the variable speed motor M1 may be operated in the first mode (i.e., the variable speed motor M1 is driven by the generator G1), the variable speed motor M2 may be operated in the second mode (i.e, the variable speed motor M2 is driven by the generator G3), and the variable speed motor M3 may also be operated in the second mode (i.e., the variable speed motor M3 is driven by the generator G4).

Person skilled in the art will recognize that operating switches will require coordination of voltage and phase angle to allow synchronization of two isolated electrical systems. Furthermore, in other embodiments, instead of the switches S1 and S2 shown in FIG. 3, the switchboard 305 may include any other switching arrangement configured to directly couple, in a one-to-one relation, the variable speed motors M1-M3 to the generators G1-G4 so that any one of the variable speed motors M1-M3 is capable of operating in at least a first mode and a second mode described above.

Figure 4:
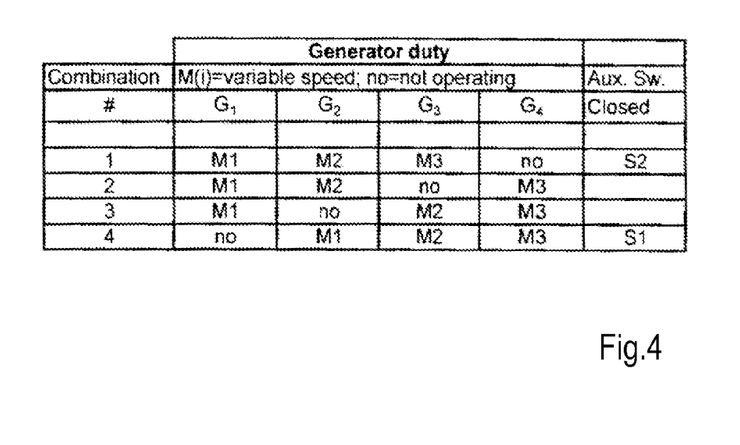
FIG. 4 illustrates a duty and switching diagram corresponding to the system of FIG. 3, according to one embodiment of the present invention.

FIG. 4 illustrates a duty and switching diagram corresponding to the system 300. As shown in FIG. 4, when the switching arrangement includes switches S1 and S2 as shown in the system 300 of FIG. 3, four combinations are possible. In the first combination, the generator G4 is not operating. By closing the switch S2, the generator G1 may be configured to drive the variable speed motor M1, the generator G2 may be configured to drive the variable speed motor M2, and the generator G3 may be configured to drive the variable speed motor M3. In the second combination, the generator G3 is not operating. By keeping both of the switches S1 and S2 open, the generators G1, G2, and G4 may be configured to drive the variable speed motors M1, M2, and M3, respectively. The other two combinations may be analyzed in a similar manner.

The (N+1) availability of the generators G1-G4 within the system 300 leads to an increased availability of the system 300 relative to that of the system 100 illustrated in FIG. 1 because even if one of the generators G1-G4 is not operating, the three variable speed motors M1-M3 may be driven by the remaining three generators. The permanent one-to-one relation between the gas turbines GT1-GT4 and the mechanical rotating equipment CPR1-CPR3 is decoupled in the system 300, allowing for continuous speed control of the mechanical rotating equipment with redundancy in the main driver-generator combination. At the same time, the direct coupling between the generators G1-G4 and the variable speed motors M1-M3 allows maintaining the overall efficiency of the system 300 substantially equal to the efficiency of system 200. The system 300 has a number of further advantages for applications that require a small footprint of the mechanical rotating equipment and physical separation between the main driver and the mechanical rotating equipment (for example, for off-shore applications). The compressors CPR1, CPR2, and CPR3 included in the system 300 have a smaller footprint than the compressors included in the system 100 because the electric variable speed motors M1-M3 are much smaller than the gas turbines of FIG. 1 or any other main driver such as steam turbine or fired engine. Second, the system 300 allows the gas turbines GT1-GT4 or any other main drivers to be located away from the processes that the compressors CPR1-CPR4 are involved in (such as, for example, liquefaction of gas), which can be beneficial because of removal of hot surfaces from the process area and by not introducing fuel in the process area. Third, the system 300 allows the gas turbines GT1-GT4 or any other main drivers to be located at a place where maintenance may be organized best. Also, if waste heat of the exhaust gases is to be utilized elsewhere on the plant, the affiliated equipment can now be located at one location thus enhancing the simplicity of the overall layout. The one-to-one relation between main driver-generator combination and mechanical rotating equipment may eliminate the requirement of having a gearbox between electric motor and mechanical rotating equipment.

In addition, if variable speed is only required during start-up or controlled stopping of the mechanical rotating equipment, the normal steady state operation may also be with N generators and N motors coupled via the switchboard 305, thus enabling load sharing between the active main drivers and generators all running at the same speed. This circuitry and operation differs, because of the maintainable one-to-one relation, from configurations presently found in the industry where multiple main driver and generators are combined on a single bus bar driving multiple motors at equal variable speed.

Figure 5:
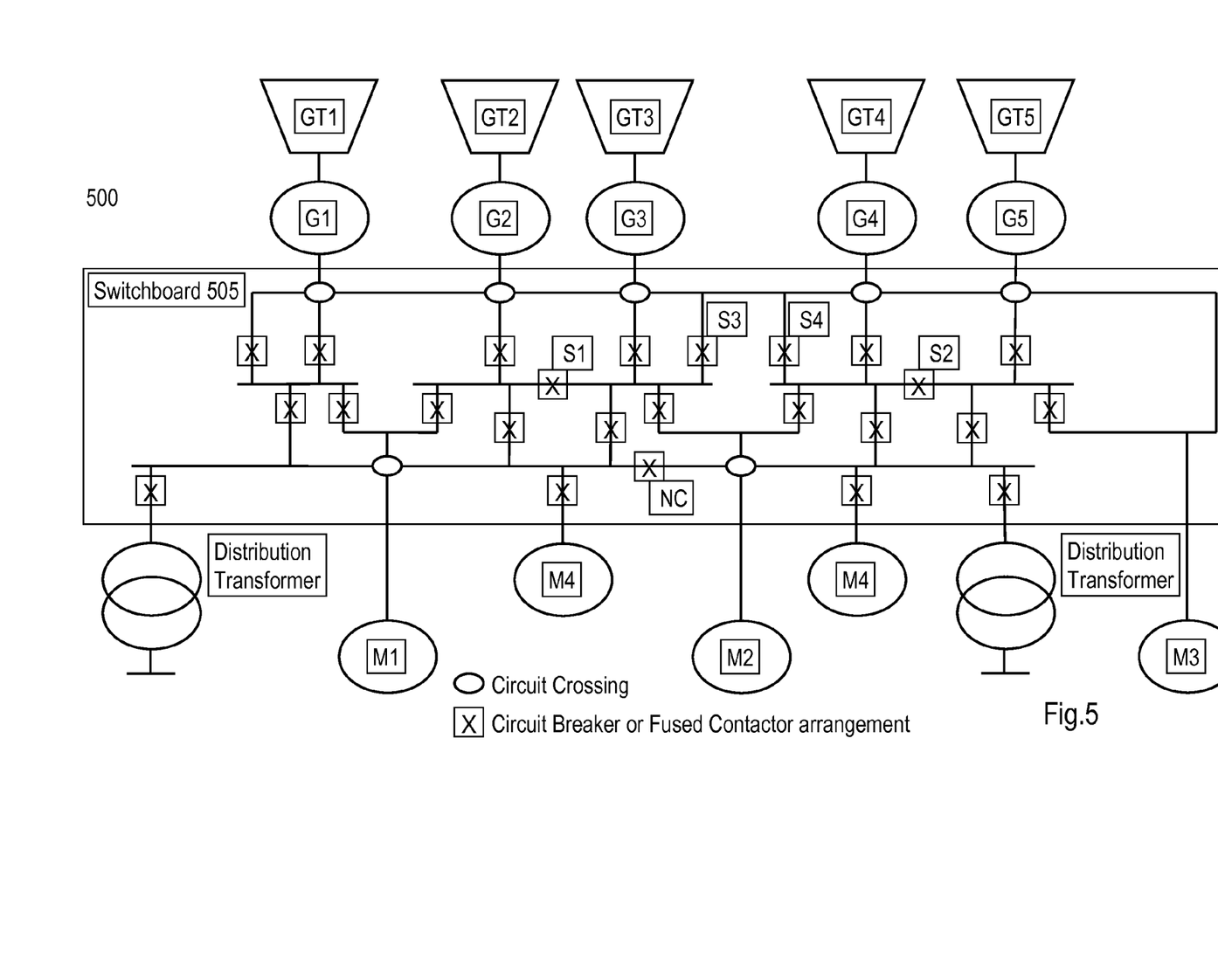
FIG. 5 is a schematic illustration of an (N+1) availability system for controlling speed of each variable speed motor, according to yet another embodiment of the present invention.

FIG. 5 is a schematic illustration of an (N+1) availability system 500 for controlling speed of each variable speed motor, according to yet another embodiment of the present invention. As shown, the system 500 includes five generators G1, G2, G3, G4, and G5 configured to convert mechanical energy to electrical energy. Again, the generators G1-G5 may receive the mechanical energy from gas turbines (shown as GT1, GT2, GT3, GT4, and GT5) or from steam turbines or other fired engines. The system 500 further includes three variable speed motors (shown as M1, M2, and M3), each possibly including one or more electrical motors, two fixed speed motors (shown as M4 and M5), and a switching arrangement (shown as a switchboard 505), configured to directly couple, in a one-to-one relation, four of the generators G1-G5 to the variable speed motors M1-M3 and to directly couple (at least one of) the remaining of the generators G1-G5 to a fixed voltage and fixed frequency bus bar 510. As used herein, the term "bus bar" refers to a strip of conductive material (such as, for example copper or aluminium) that conducts electricity within a switchboard or other electrical apparatus. Each of the variable speed motors M1-M3 is, in turn, connected to a piece of mechanical rotating equipment, for example, a compressor, shown as CPR1, CPR2, and CPR3.

Similar to FIG. 3, four of the generators G1-G5 are configured to drive each of the variable speed motors M1-M3 with a variable drive voltage. Again, the drive voltage may be varied (modulated) in amplitude, frequency, or both amplitude and frequency, in order to achieve the desired speed of each of the variable speed motors M1-M3. Variable speed motors M1-M3 are typically driven by a 3-phase AC voltage. In turn, the variable speed motors M1, M2, and M3 are configured to convert the electrical energy of the variable drive voltage to the mechanical energy that drives the compressors CPR1, CPR2, and CPR3. Thus, by modulating the drive voltage provided to the variable speed motors M1-M3 to control the speed and the torque of the motors M1-M3, the rotational speed of the compressors CPR1-CPR3 may be controlled. If variable speed is only required during start-up or controlled stopping of the machinery, the normal steady state operation may also be with N+1 generators and N motors combined on bus bars 510, 520 and 530 at a fixed voltage and a fixed frequency thus enabling load sharing between the active main drivers and generators. Alternatively, one or more of the motors can also be exchanged for one or more electrical distribution networks by introducing multiple bus bars systems in lieu of the motor and mechanical rotating equipment.

By using switches, the switchboard 505 allows any of the variable speed motors M1-M3 to be driven by at least two of the generators G1-G5. For example, the switchboard 505 may include switches S1, S2, S3, and S4 as shown on FIG. 5. The switches S1-S4 allow the variable speed motor M1 to be driven, in the first mode, by the generator G1, in the second mode, by the generator G2, and, in the third mode, by the generator G3. Similarly, the switches S1-S4 allow the variable speed motor M2 to be driven, in the first mode, by the generator G2, in the second mode, by the generator G3, and, in the third mode, by the generator G4. Finally, the variable speed motor M3 may be driven, in the first mode, by the generator G1, in the second mode, by the generator G4, and, in the third mode, by the generator G5. With such a configuration, if, for example, the generator G2 is out of service and the generator G5 is providing fixed voltage to the fixed voltage and fixed frequency bus bar 510, all of the variable speed motors M1-M3 may still remain operating. In such a case, the variable speed motor M1 may be operated in the third mode (i.e., the variable speed motor M1 is driven by the generator G3), the variable speed motor M2 may also be operated in the third mode (i.e, the variable speed motor M2 is driven by the generator G4), and the variable speed motor M3 may be operated in the first mode (i.e., the variable speed motor M3 is driven by the generator G1).

Figure 6:
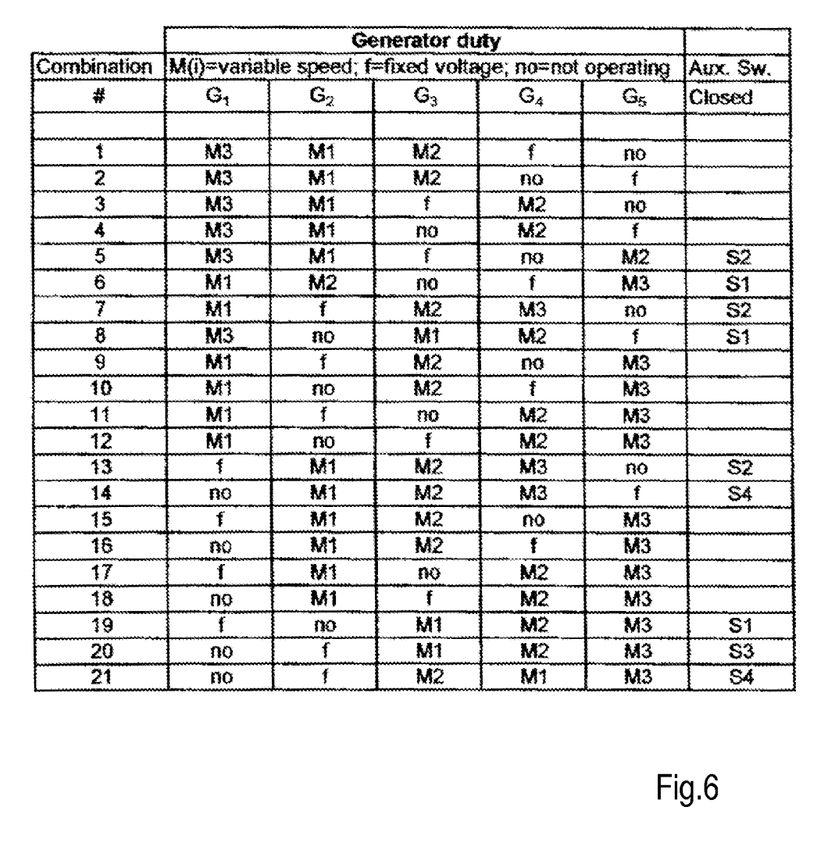
FIG. 6 illustrates a duty and switching diagram corresponding to the system of FIG. 5, according to one embodiment of the present invention.

FIG. 6 illustrates a duty and switching diagram corresponding to the system 500. As shown in FIG. 6, when the switching arrangement includes switches S1-S4 as shown in the system 500 of FIG. 5, twenty one combinations are possible. In the first combination, the generator G4 is not operating (i.e, the generator G4 may be, for example, out of service due to failure or maintenance, or may be in a stand by mode) and the generator G5 is providing fixed voltage to the fixed voltage and fixed frequency bus bar 510. In this case, the generator G1 may be configured to drive the variable speed motor M3, the generator G2 may be configured to drive the variable speed motor M1, and the generator G3 may be configured to drive the variable speed motor M2, while all of the switches S1-S4 remain open. In the second combination, the generator G5 is not operating and the generator G4 is providing fixed voltage to the fixed voltage and fixed frequency bus bar 510. In this case, the generators G2, G3, and G1 may be configured to drive the variable speed motors M1, M2, and M3, respectively, as in the first combination. In the third combination, the generator G3 is not operating and the generator G5 is providing fixed voltage to the fixed voltage and fixed frequency bus bar 510. In this case, the generator G1 may be configured to drive the variable speed motor M3, the generator G2 may be configured to drive the variable speed motor M1, and the generator G4 may be configured to drive the variable speed motor M2, while all of the switches S1-S4 remain open. The other combinations may be analyzed in a similar manner.

In this manner, the (N+1) power availability may be provided for the variable speed motors M1-M3 as well as for the fixed voltage and fixed frequency power consumers, such as, for example, the fixed speed motors M4 and M5. In general, in a system including N variable speed motors and N+K generators, where N is an integer equal to or greater than 1 and K is an integer equal to or greater than 2, the N variable speed motors may be directly coupled to (N+1) generators, while the remaining (K−1) generators may be connected to a fixed voltage and fixed frequency bus bar (with one of the generators being in stand by mode or in maintenance). If variable speed is only required during start-up or controlled stopping of the machinery, the normal steady state operation may also be with N+1 generators and N motors combined on bus bars 510, 520 and 530 thus enabling load sharing between the active main drivers and generators.

Persons skilled in the art will recognize that while FIGS. 2, 3, and 5 illustrate the generators receiving mechanical energy from gas turbines, in other embodiments the generators may also receive mechanical energy from other fired engine, such as, for example, steam turbine, gas motor or diesel motor operating on any fuel. Furthermore, while FIGS. 2, 3, and 5 illustrate compressors being connected to the variable speed motors, in other embodiments, other types of mechanical rotating equipment may be used, such as, for example, pumps, fans, blowers and ship's propulsion. In addition, any of the variable speed motors M1-M3 and any of the fixed speed motors M4 and m5 illustrated in FIGS. 2, 3, and 5, may comprise one or more motors.

One advantage of the present invention is that increased reliability of the system may be realized by operating the generators at (N+1) availability. At the same time, the one-to-one correspondence between the generators and the variable speed motors due to the direct coupling allows preserving speed and torque control and sufficiently high efficiency of the overall system over any electronic speed control unit, while maintaining a relatively small footprint of the variable speed motor as well as a relatively small cost to obtain (N+1) availability. In addition, because of the absence of switching electronics, no harmonic distortion is introduced to the fixed voltage and fixed frequency consumers. The electric power generation equipment will not be installed in the area where the rotating equipment will be located, i.e. process modules.

This is especially relevant for offshore applications where safety and maintainability are predominant aspects governing the equipment arrangement.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A system for controlling a speed of each of N variable speed motors with a drive voltage, where N is an integer equal to or greater than 1, comprising:
    (N+1) generators configured to drive the N variable speed motors; and
    a switching arrangement configured to directly couple, in a one-to-one relation, the N variable speed motors to present generators so that any one of the N variable speed motors is capable of operating in at least a first mode and a second mode,
    wherein:
    the present generators comprise the (N+1) generators,
    in the first mode the any one of the N variable speed motors is driven with the drive voltage generated by a first generator of at least two of the present generators, and
    in the second mode the any one of the N variable speed motors is driven with the drive voltage generated by a second generator of the at least two of the present generators.

2. The system of claim 1, further comprising an additional generator, wherein:
    the present generators further comprise the additional generator,
    the switching arrangement further includes a fixed voltage and fixed frequency bus bar, and
    the switching arrangement is further configured to directly couple one of the present generators to the fixed voltage and fixed frequency bus bar.

3. The system of claim 2, wherein one or more fixed speed motors are connected to the fixed voltage and fixed frequency bus bar.

4. The system of claim 1, wherein each of the present generators is connected to a main driver.

5. The system of claim 4, wherein the main driver comprises a gas turbine.

6. The system of claim 1, wherein the N variable speed motors comprise at least one of an electric induction motor or a synchronous motor.

7. The system of claim 1, wherein each of the N variable speed motors is configured to drive mechanical rotating equipment.

8. The system of claim 1, wherein the drive voltage is a single-phase voltage.

9. The system of claim 1, wherein the first generator or the second generator comprises a dedicated stand-by generator.

10. The system of claim 1, wherein the system comprises an off-shore power system.

11. The system of claim 1, wherein the drive voltage is a 3-phase AC voltage.

12. The system of claim 1, wherein each of the N variable speed motors comprises one or more electrical motors.

13. A method for controlling a speed of each of N variable speed motors with a drive voltage, where N is an integer equal to or greater than 1, in a system comprising:
    (N+1) generators configured to drive the N variable speed motors; and
    a switching arrangement configured to directly couple, in a one-to-one relation, the N variable speed motors to present generators so that any one of the N variable speed motors is capable of operating in at least a first mode and a second mode, and wherein the present generators comprise the (N+1) generators, the method comprising:
    in the first mode, driving the any one of the N variable speed motors with the drive voltage generated by a first generator of at least two of the present generators, and
    in the second mode, driving the any one of the N variable speed motors with the drive voltage generated by a second generator of the at least two of the present generators.

14. The method of claim 13, wherein the present generators further comprise an additional generator, and wherein the switching arrangement further includes a fixed voltage and fixed frequency bus bar, and the method comprises operating the switching arrangement to directly couple one of the present generators to the fixed voltage and fixed frequency bus bar.

15. The method of claim 14, and connecting one or more fixed speed motors to the fixed voltage and fixed frequency bus bar.

16. The method of claim 13, and further comprising connecting each of the present generators to a main driver.

17. The method of claim 16, wherein the main driver comprises a gas turbine.

18. The method of claim 13, wherein the N variable speed motors comprise at least one of an electric induction motor or a synchronous motor.

19. The method of claim 13, and further comprising connecting each of the N variable speed motors to drive mechanical rotating equipment.

20. The method of claim 13, wherein the drive voltage is a single-phase voltage.

21. The method of claim 13, wherein the first generator or the second generator comprises a dedicated stand-by generator.

22. The method of claim 13, wherein the system comprises an off-shore power system.

23. The method of claim 13, wherein the drive voltage is a 3-phase AC voltage.

24. The method claim 13, wherein each of the N variable speed motors comprises one or more electrical motors.

25. The system of claim 1, wherein N is equal to or greater than 2.

26. The system of claim 25, wherein:
    the switching arrangement is further configured so that a first motor and a second motor of the N variable speed motors may be driven simultaneously with different driving voltages.

27. The method of claim 1, wherein N is equal to or greater than 2.

28. The method of claim 27, wherein the switching arrangement is further configured so that a first motor and a second motor of the N variable speed motors may be driven simultaneously, the method further comprising:
  driving the first motor and the second motor simultaneously with different driving voltages.

* * * * *